US009334029B2

(12) United States Patent
Miyamoto et al.

(10) Patent No.: US 9,334,029 B2
(45) Date of Patent: May 10, 2016

(54) SHIP MONITORING DEVICE
(71) Applicant: THE YOKOHAMA RUBBER CO., LTD., Tokyo (JP)
(72) Inventors: Masahiko Miyamoto, Kanagawa (JP); Shu Yamada, Kanagawa (JP); Shigeki Sakakibara, Kanagawa (JP); Kazunori Ono, Kanagawa (JP); Koji Nakatani, Kanagawa (JP); Michito Kaneko, Kanagawa (JP)
(73) Assignee: THE YOKOHAMA RUBBER CO., LTD., Tokyo (JP)
( * ) Notice: Subject to any disclaimer, the term of this patent is extended or adjusted under 35 U.S.C. 154(b) by 0 days.
(21) Appl. No.: 14/406,655
(22) PCT Filed: Jul. 22, 2013
(86) PCT No.: PCT/JP2013/069748
§ 371 (c)(1),
(2) Date: Dec. 9, 2014
(87) PCT Pub. No.: WO2014/017422
PCT Pub. Date: Jan. 30, 2014
(65) Prior Publication Data
US 2015/0158564 A1 Jun. 11, 2015
(30) Foreign Application Priority Data Jul. 23, 2012 (JP) ................................ 2012-162479
Jul. 23, 2012 (JP) ................................ 2012-162486

(51) Int. Cl.
*G08G 3/00* (2006.01)
*B63B 45/04* (2006.01)
(Continued)
(52) U.S. Cl.
CPC ................ *B63B 45/04* (2013.01); *B63B 21/00* (2013.01); *B63B 43/18* (2013.01); *B63B 45/08* (2013.01);
(Continued)
(58) Field of Classification Search
CPC ........ B63B 45/04; B63B 45/08; B63B 43/18;
B63B 59/02; B63B 49/00; B63B 21/00;
B63J 2099/006; B63J 99/00; G08G 3/00;
G08G 3/02; G01S 7/12; G01S 7/22; G01S
13/02; G01S 13/9307
USPC ........................................................ 340/985
See application file for complete search history.

(56) References Cited

U.S. PATENT DOCUMENTS 4,169,423 A * 10/1979 Laskey .................... B63B 35/70
114/151
6,448,903 B1 * 9/2002 Hattori .................. G01L 19/086
114/219
(Continued)

FOREIGN PATENT DOCUMENTS

EP    0945552 A1    9/1999
EP    2078669 A1    7/2009
(Continued)

OTHER PUBLICATIONS

International Search Report dated Oct. 29, 2013 filed in PCT/JP2013/069748.

*Primary Examiner* — Firmin Backer
*Assistant Examiner* — Adnan Aziz
(74) *Attorney, Agent, or Firm* — Rankin, Hill & Clark LLP

(57) ABSTRACT

A position of a target ship alongside is displayed in animation on a display unit 17 by the computer 11 based on any one of the positional information on the target ship alongside, which is transmitted from an automatic identification system (AIS) of a target ship alongside and is obtained by an AIS communication unit 13, positional information on the target ship alongside, which is obtained by the GNSS communication unit 14 from a global navigation satellite system, and positional information on the target ship alongside, which is manually inputted via an operation unit 18. Therefore, the latest position of the target ship alongside can be always displayed in animation.

18 Claims, 16 Drawing Sheets

(51) Int. Cl.
  *B63B 21/00* (2006.01)
  *B63B 49/00* (2006.01)
  *B63B 59/02* (2006.01)
  *B63B 43/18* (2006.01)
  *B63B 45/08* (2006.01)
  *B63J 99/00* (2009.01)
  *G01C 21/20* (2006.01)

(52) U.S. Cl.
  CPC ............... *B63B 49/00* (2013.01); *B63B 59/02* (2013.01); *B63J 99/00* (2013.01); *G01C 21/203* (2013.01); *B63B 2213/00* (2013.01); *B63B 2213/02* (2013.01); *B63J 2099/006* (2013.01); *B63J 2099/008* (2013.01)

(56) References Cited

U.S. PATENT DOCUMENTS

| | | | | |
|---|---|---|---|---|
| 6,486,800 | B1 | 11/2002 | Hattori | |
| 7,817,079 | B1* | 10/2010 | Funk | G01S 7/003 342/41 |
| 2003/0063910 | A1* | 4/2003 | Hattori | B63B 59/02 396/611 |
| 2006/0075951 | A1* | 4/2006 | Aschenbach | B63B 59/02 114/219 |
| 2009/0079590 | A1* | 3/2009 | Hiraoka | B63B 49/00 340/984 |
| 2009/0315756 | A1* | 12/2009 | Imazu | B63B 49/00 342/41 |
| 2010/0070118 | A1* | 3/2010 | Yamada | B63B 21/00 701/21 |
| 2011/0084870 | A1* | 4/2011 | Kondo | B63B 49/00 342/41 |
| 2015/0140942 | A1* | 5/2015 | Nakatani | H01Q 7/00 455/129 |

FOREIGN PATENT DOCUMENTS

| | | | | |
|---|---|---|---|---|
| JP | 2000255486 | A2 | 9/2000 | |
| JP | 2007004428 | A2 | 1/2007 | |
| JP | 2010175298 | A2 | 8/2010 | |
| KR | 10200501147741 | | 12/2005 | |
| KR | 20110035326 | * | 4/2011 | |
| WO | 9920845 | A1 | 4/1999 | |
| WO | 2008053887 | A1 | 5/2008 | |
| WO | WO 2012063527 | A1 * | 5/2012 | G01D 3/10 |

* cited by examiner

FIG. 14

| MMSI | Ship Name | Call Sign | IMO | Speed(kt) | Longitude | Latitude | |
|---|---|---|---|---|---|---|---|
| 309987000 | SPT CHAMPION | C6WD3 | 9336397 | 3.1 | -89.676752 | 28.106163 | Own Ship |
| 366990380 | JUSTIN CALLAIS | WCZ5803 | 8964850 | 1.9 | -89.720908 | 28.105042 | Delete |
| 209423000 | | | | 9.5 | -89.852367 | 28.09816 | Delete |
| 209017000 | UBC TARRAGONA | 5BWR2 | 9416719 | 14.6 | -89.925013 | 27.947303 | Delete |
| 368020000 | | | | 9.3 | -89.5687 | 28.147968 | Delete |
| 538001175 | | | | .3 | -89.696665 | 28.095933 | Delete |
| | SAMCO CHINA | | | | -89.696182 | 28.096383 | Delete |
| 338714000 | | | | | -89.4401 | 28.013425 | Delete |
| 235050783 | BRITISH EMISSARY | MVQP8 | 9315769 | 7.0 | -89.558215 | 28.38075 | Delete |
| 367058853 | | | | .5 | -89.675345 | 28.061825 | Delete |
| 351224000 | SERENE SKY | 3EUZ9 | 9514353 | 10.5 | -89.31612 | 28.645427 | Delete |
| 538003635 | | | | .0 | -89.976498 | 27.9157 | Delete |
| 368061000 | | | | .1 | -89.227048 | 28.171497 | Delete |
| 367097610 | | | | 2.6 | -90.05749 | 28.310483 | Delete |
| 636012846 | | | | .0 | -89.285157 | 28.181368 | Delete |
| 367063220 | | | | .1 | -89.103588 | 28.153715 | Delete |
| 249876000 | MARIBELLA | 9HA2052 | 9316672 | | | | Delete |
| 303603000 | | | | .0 | -89.285215 | 28.180417 | Delete |
| | | | | | | | Delete |
| | | | | | | | Delete |

Target: ○ Ship  ● Shore

For Demo
○ Real Speed
○ 2X Speed
● 5X Speed

Data Reset    Sort    Set and Return    Cancel 120a  120b  120c  120d  120e  120

AIS Communication
Own  CLEAR

SHIP MONITORING DEVICE

TECHNICAL FIELD

The present invention relates to a ship monitoring device for, in a case where a ship comes alongside a target object alongside such as another ship or a quay and in a case where the two ships are moored to each other, providing, to an operator, information on positional relationships between the ship and the target, object alongside and between the two ships moored to each other, and information on a state of fenders.

BACKGROUND ART

Conventionally, in a case where a ship comes alongside a target object, an operator needs to pay close attention to prevent damage to the ship.

In a case where, in, for example, well-known STS (Ship-To-Ship) and FPSO (Floating Production Storage and Off-loading), two ships such as crude oil tankers come alongside each other on the sea and loading and unloading are performed between the ships, the ships should be close to each other and moor the ships to each other. Therefore, it is extremely important to design fenders positioned between the ships and a technique of steering a ship by an operator. Similarly, a technique of steering a ship by an operator is extremely important also in a case where the operator causes own ship to come alongside a quay.

For example, in a case where the weather is getting worse, a ship unintentionally approaches to another ship or a quay too close even with a technique of an operator. This breaks a fender positioned between the ships or between the ship and the quay, and, in some cases, the ship contacts to the another ship or the quay and is damaged.

In particular, in a case where the loading and unloading are performed at night after the ships are moored to each other, it is difficult to visually recognize a state of a mooring rope and lenders positioned on the sea. It is also difficult to know how much load is applied to the mooring rope and the fenders and in what state the mooring rope and the fenders are.

Therefore, the inventors of the present invention previously proposed a method and a system for assisting steering/mooring of a vessel (WO 2008/053887 A (Patent Document 1)).

There are similar known techniques including: another ship target display device disclosed in JP-A-2007-4428 (Patent Document 2); an air pressure monitoring device of a pneumatic fender and a centralized control system for the same disclosed in JP-A-2010-175298 (Patent Document 3); and a fender and a management system therefor disclosed in WO 99/20845 A (Patent Document 4).

In a case where ships come alongside each other and in a case where loading and unloading are perforated while the ships are being moored to each other, a method and a system for assisting steering/mooring of a vessel, disclosed in Patent Document 1 display information on a positional relationship between the two ships and information on fenders. Thus, the positional relationship between the ships and a state of the fenders can be easily understood.

The another ship target display device disclosed in Patent Document 2 is configured to display positional and detailed information on almost all ships existing in a predetermined region around own ship to make an operator easily understand the positional and detailed information.

In the air pressure monitoring device of a pneumatic fender and the centralized control system for the same, disclosed in Patent Document 3, a pneumatic fender includes a plurality of pressure sensors. The pressure sensors transmit air pressure sensing signals repeatedly in turn so that transmission states of the pressure sensors are continued at predetermined intervals. Therefore, the air pressure of the pneumatic fender can be continuously monitored.

In the fender and the management system therefor, disclosed in Patent Document 4, information storage means of a transponder provided in each of a plurality of fenders is accessed by a terminal device. Then, information stored in the information storage means is read out, and the read out information is displayed. In this way, the plurality of fenders is managed.

CITATION LIST

Patent Literatures

Patent Document 1: WO 2008/053887 A
Patent Document 2: JP-A-2007-4428
Patent Document 3: JP-A-2010-175298
Patent Document 4: WO99/20845 A

SUMMARY OF INVENTION

Problems to be Solved by the Invention

In a case where own ship comes alongside a target object alongside such as a quay and another ship and in a case where the two ships are moored to each other, it is extremely important for an operator to know information on a positional relationship between the ship and the target object and between the two ships moored to each other, and information on a state and the like of an air pressure inside a fender serving as a cushioning material when the ship comes alongside the target object. A system for enabling two ships to easily come alongside each other or the like is disclosed in detail in Patent Document 1 as described above.

However, while pursuing the development of a system, in some cases, the inventors have come across a deficiency of information on a state of fenders, which would be provided to an operator. Therefore, a load was excessively applied to the fenders. In addition, it was found that displaying information on a positional relationship between two ships with use of more pieces of information was preferable to improve accuracy of displayed information and therefore to easily steer the ship. Further, there is a problem, in how to perform display to steer the ship more easily in a case where own ship comes alongside another ship.

An object of the present invention is to provide a ship monitoring device capable of displaying more pieces of information on a state of fenders and therefore capable of performing display that allows an operator to steer a ship more easily. Another object of the present invention is to provide a ship monitoring device capable of displaying positional information on ships more accurately and therefore capable of performing display that allows an operator to steer a ship more easily.

Solutions to the Problems

To achieve the object, a first embodiment of the present invention provides a ship monitoring device, including: a display unit configured to display in animation a position of the own ship and a position of the target ship alongside to display a state in which the own ship comes alongside the target ship alongside, based on information on own ship navigating on the sea and information on a target ship alongside;

an air pressure obtaining unit configured to obtain internal air pressure information on a plurality offenders serving as a cushioning material that is positioned between the own ship and the target ship alongside in a case where the own ship comes alongside the target ship alongside; means for receiving AIS information transmitted from an automatic identification system (AIS) of the target ship alongside and including positional information on the target ship alongside; storage means for storing the received AIS information; communication means for obtaining, from the target ship alongside, positional information obtained from a global navigation satellite system; means for manually inputting positional information on the target ship alongside; means for rewriting the positional information on the target ship alongside stored in the storage means with use of any one of the positional information obtained by the communication means and the positional information manually inputted; and means for displaying the position of the target ship alongside based on the information stored in the storage means.

According to a first embodiment of the present invention, the position of the target ship alongside is displayed in animation based on any one of the positional information on the target ship alongside, which is transmitted from the automatic identification system (AIS) of the target ship alongside, the positional information on the target ship alongside, which is obtained from the global navigation satellite system, and the positional information on the target ship alongside, which is manually inputted. Therefore, based on the latest positional information on the target ship alongside, the position of the target ship alongside can be always displayed in animation.

To achieve the object, a second embodiment of the present invention provides a ship monitoring device, including: a display unit configured to display in animation a position of the own ship and a position of the target object alongside to display a state in which the own ship comes alongside the target object alongside, based on information on own ship navigating on the sea and information on a target object alongside; a fender information obtaining unit configured to obtain fender information including internal air pressure information and internal temperature information of a plurality of fenders serving as a cushioning material that is positioned between the own ship and the target object alongside in a case where the own ship comes alongside the target object alongside; a storage unit configured to store predetermined information; means for obtaining the fender information in a state in which external force is not applied to the fenders and storing, in the storage unit, the obtained fender information as fender initial information; means for obtaining the fender information in a state in which external force is applied to the fenders and calculating a degree of deformation of the fenders with use of the obtained fender information and the fender initial information; means for obtaining positional information on the own ship and storing the obtained positional information in the storage unit; means for manually inputting positional information on the target object alongside; means for storing, in the storage unit, the manually inputted positional information on the target object alongside; and means for, based on the information stored in the storage means, displaying the position of the target object alongside and the position of the own ship and displaying the fender information and the degree of deformation.

According to the second embodiment of the present invention, the positions of the target object alongside and the own ship are displayed in animation. In addition, the air pressure and the temperature of each fender and the degree of deformation of the each fender are displayed as the fender information.

Effects of the Invention

A ship monitoring device in the first embodiment of the present invention can always display a position of a target ship alongside in animation based on the latest positional information on the target ship alongside. Therefore, accurate information can be displayed in real time. Further, by using the ship monitoring device of the present invention, in a case where own ship comes alongside the target ship alongside, a ship more can be easily steered, as compared with conventional ship monitoring devices. A ship monitoring device in the second embodiment of the present invention displays the positions of a target object alongside and own ship in animation. In addition, not only an air pressure and a temperature of each fender but also a degree of deformation of the each fender are displayed as fender information. Therefore, more pieces of information on the fenders can be displayed, as compared with conventional ship monitoring devices. Furthermore, by using the ship monitoring device of the present invention, in a case where the own ship comes alongside the target object alongside, a ship can be more easily steered without excessively applying a load to the fenders.

BRIEF DESCRIPTION OF THE DRAWINGS

FIG. 14 illustrates an AIS Communication screen in one embodiment of the present invention.

DESCRIPTION OF EMBODIMENTS

One embodiment of the present invention will be described below with reference to drawings.

Figure 1:
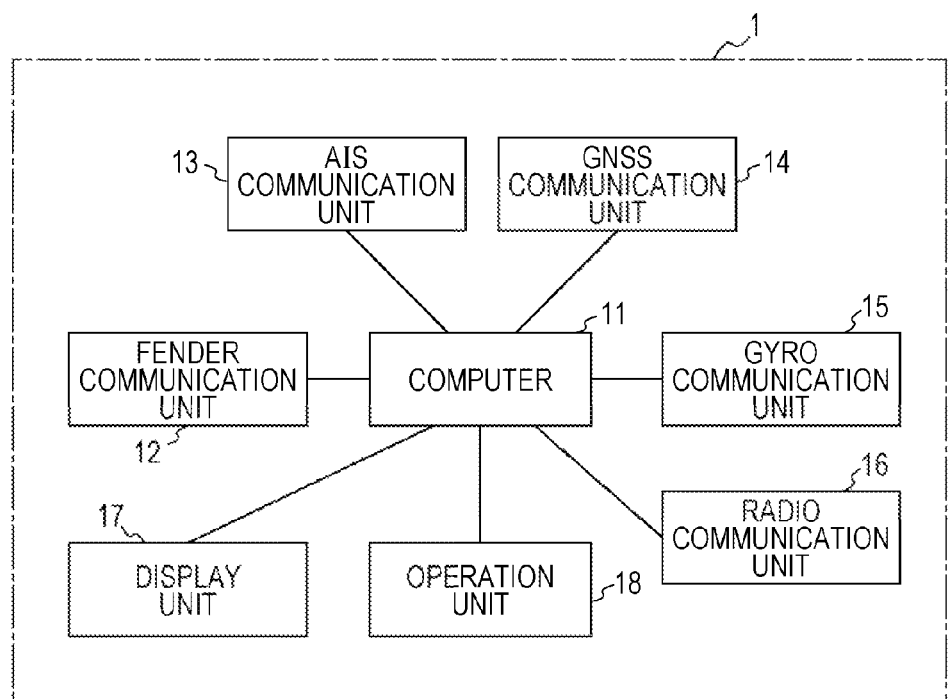
FIG. 1 is a block diagram illustrating a ship monitoring device in one embodiment of the present invention.

FIG. 1 is a block diagram illustrating a ship monitoring device in one embodiment of the present invention. In FIG. 1, a ship monitoring device 1 includes a computer 11, a fender communication unit 12, an AIS communication unit 13, a GNSS communication unit 14, a gyro communication unit 15, a radio communication unit 16, a display unit 17, and an operation unit 18. The ship monitoring device 1 is provided in a pilothouse of a ship.

The computer 11 includes a computer main body, a keyboard, a mouse, a storage device, and a display device, and the like which are well-known in the art. A ship monitoring program, has been previously stored in the storage device of the computer 11. The computer 11 is operated by the ship monitoring program. The computer 11 chronologically stores, in the storage device included in the computer 11, information obtained from the fender communication unit 12, the AIS communication unit 13, the GNSS communication unit 14, the gyro communication unit 15, and the radio communication unit 16. Based on multiple pieces of the obtained information, the computer 11 displays positional information on own ship and another ship or a quay, which serves as a target object alongside, in animation in real time. The computer also displays information such as internal air pressures and internal temperatures offenders on the display unit 17 in real time. The computer 11 further displays the multiple pieces of the obtained information on the display unit 17. In addition, the computer 11 executes an operation instruction inputted via the operation unit 18.

The computer 11 stores, in the storage device, as fender state initial information, information received from the fenders in a state in which external force is not applied to the fenders. Further, the computer 11 chronologically stores, in a storage unit, information (fender state information) received from the fenders in a state in which external force is applied to the fenders. The computer 11 further calculates a degree of deformation of each fender with use of the information received from the fenders and the fender state initial information. The computer 11 also chronologically stores, in the storage unit, information on the degree of deformation, and displays the information on the display unit 17. Note that the degree of deformation of the each fender is calculated with use of an initial internal air pressure and an initial internal temperature, and an internal air pressure and an internal temperature at a time of measurement.

The fender communication unit 12 performs communication between the computer 11 and transponders provided in the respective fenders. Therefore, the fender communication unit 12 obtains information on air pressures, temperatures, and the like inside the fenders. The fender communication unit 12 outputs the obtained information in form of digital data to the computer 11. Usually, a ship or a quay is furnished with four fenders to be used when the ship comes alongside a quay or another ship. Each of the fenders includes the transponder including a sensor. The air pressure and the temperature inside the fender are detected by the sensor. Results of such detection are transmitted by the transponder. The transponder also transmits not only information on the results of the detection of the air pressure and the temperature but also a serial number of the sensor.

As is well known, the AIS (Automatic Identification System) communication unit 13 transmits AIS information on an identification signal, name, a position, a course, a speed, a destination, and the like of the own ship in form of digital data. The AIS communication unit 13 also receives AIS information on a ship around the own ship (another ship) and outputs such received data to the computer 11.

The GNSS (Global Navigation Satellite System) communication unit 14 includes a GPS (Global Positioning System) receiver. As is well known, the GNSS communication unit 14 receives radio waves transmitted from a plurality of navigation satellites. In this way, the GNSS communication unit 14 obtains information such as the positional information, speed information, and posture information of the own ship. The GNSS communication unit 14 outputs the above information in form of digital data to the computer 11.

The gyro communication unit 15 includes a well-known gyroscope. The gyro communication unit 15 detects an angle and an angular velocity of the own ship. The gyro communication unit 15 outputs such detected information in form of digital data to the computer 11.

Based on an instruction of the computer 11, the radio communication unit 16 transmits the information on the own ship with use of radio waves having a predetermined frequency. The radio communication unit 16 also receives information on another ship transmitted from the another ship. The radio communication unit 16 also outputs the received information in form of digital data to the computer 11. For example, the information on the own ship are information on a position (latitude, longitude) of the ship, information on a speed (speed, speed direction), information on a bow direction, information on a shape (length, width) of the ship, information on a center of gravity of the ship, information on a manifold position and regarding on which side (right or left) the ship comes alongside another ship, information on a shape of the fenders, information on the internal air pressures of the fenders, and information on a position where a GPS reception antenna is provided. Information on the another ship transmitted from the another ship is similar to the above information. The above information is shared, via the radio communication unit 16, by the own ship and the another ship serving as the target object alongside. Therefore, in a case where the own ship and the another ship come alongside each other, the positional information on the own ship and the another ship can be accurately displayed in real time on the display unit 17. A change in air pressures inside the fenders in real time on the display unit 17.

The display unit 17 includes a well-known display such as a liquid crystal display. The display unit 17 displays an image and a character based on information transmitted from the computer 11.

The operation unit 18 includes a touch panel, a mouse, and a keyboard provided to the display of display unit 17. Because those touch panel, mouse, and keyboard are connected to the computer 11, the operation unit 18 individually outputs, to the computer 11, an operation instruction and inputted information from an operator in form of digital data.

Figure 2A:
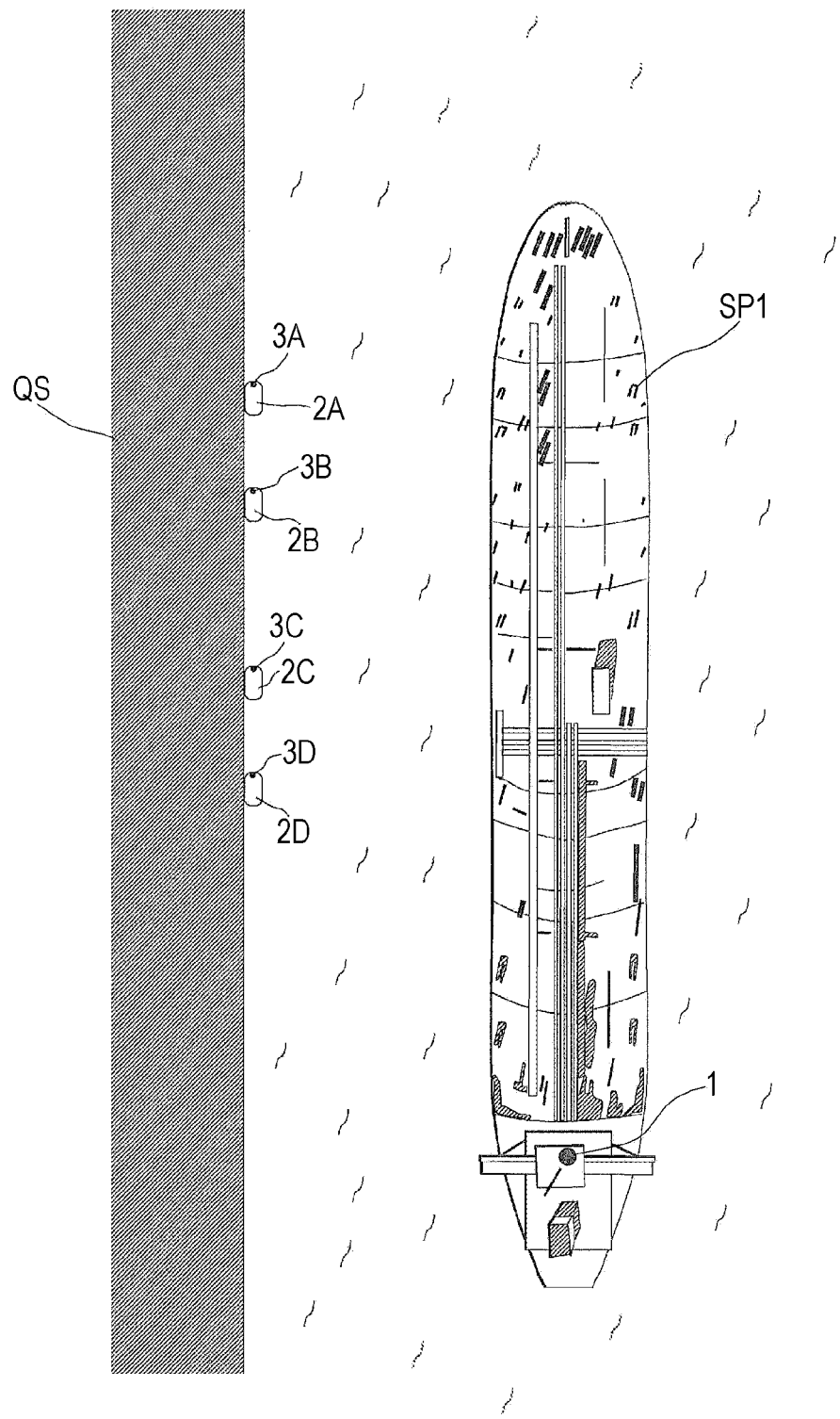
FIG. 2A illustrates a state of a target ship alongside and own ship on the sea.
Figure 2B:
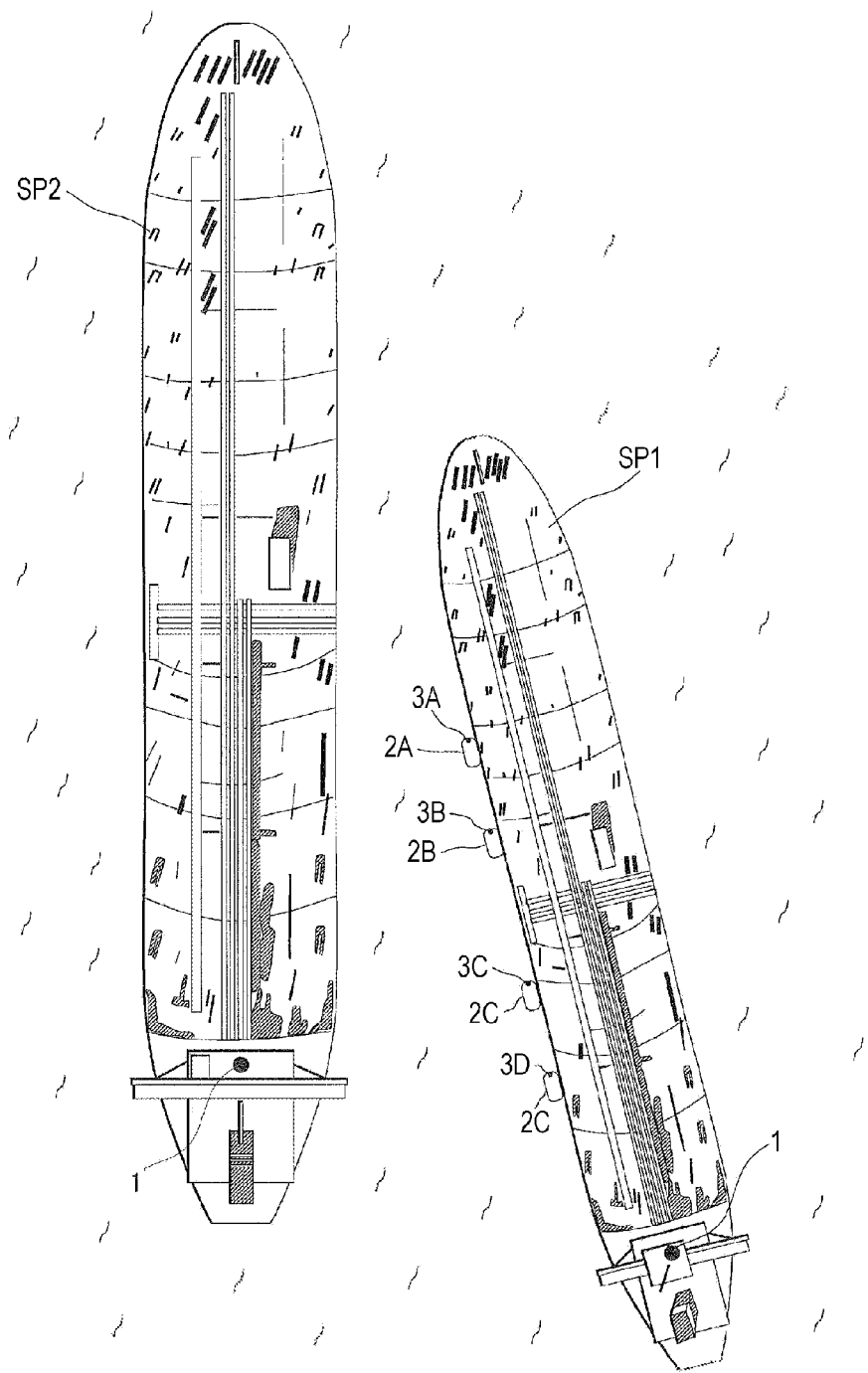
FIG. 2B illustrates a state of a target ship alongside and own ship on the sea.

An operation of the ship monitoring device in this embodiment will be described with reference to FIG. 2A to FIG. 19. As illustrated in FIG. 2A, this embodiment will describe a case where own ship SP1 comes alongside a quay QS. The quay QS is furnished with four fenders 2A to 2D. The fenders 2A to 2D include transponders 3A to 3D, respectively. Note that, as illustrated in FIG. 2B, this embodiment is also applicable to a case where, on the sea, the own ship SP1 comes alongside a target ship alongside SP2 anchored on the sea. Note that the target ship alongside SP2 is furnished with a ship monitoring device 1 equivalent to a ship monitoring device 1 with which the own ship SP1 is furnished. The own ship SP1 is furnished with four fenders 2A to 2D on a left side of the ship. The fenders 2A to 2D include transponders 3A to 3D, respectively.

Figure 3:
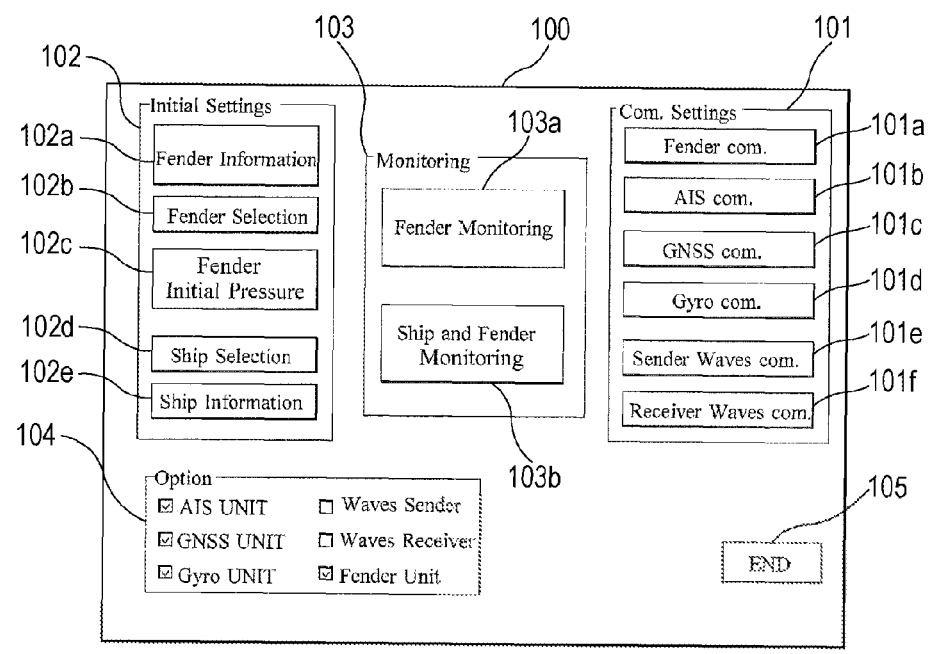
FIG. 3 illustrates a main screen in one embodiment of the present invention.

When the ship monitoring device 1 is started, a main screen 100 illustrated in FIG. 3 is displayed on a display of the display unit 17 by the computer 11. A used device communication-related setting region 101, an initial setting region 102, a monitoring mode selection region 103, a used device selection region 104, and a termination button 105 are displayed on the main screen 100. At a time of initial starting, initial setting is performed by operating buttons of the used device communication-related setting region 101, the initial setting region 102, and the used device selection region 104. Thereafter, a monitoring mode is selected by operating buttons in the monitoring mode selection region 103, and then a monitoring screen is displayed. Therefore, in a case where the ship comes alongside another ship, an operator can easily steer a ship while watching the monitoring screen.

A "Fender com." button 101a, an "AIS com." button 101b, a "GNSS com." button 101c, a "Gyro com." button 101d, a "Sender Waves com." button 101e, and a "Receiver Waves com." button 101f are displayed in the used device communication-related setting region 101.

Figure 4:
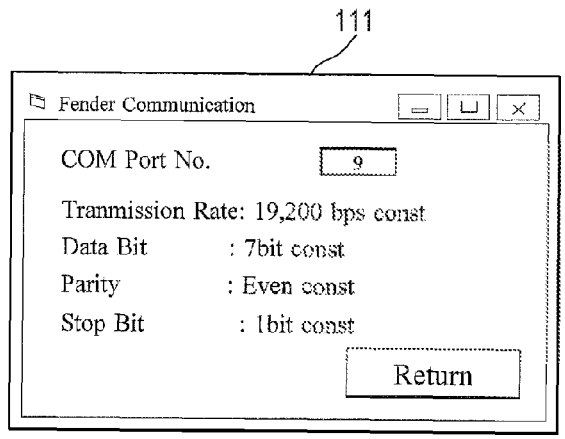
FIG. 4 illustrates a Fender Communication screen in one embodiment of the present invention.

The "Fender com." button 101a is operated when a setting regarding communication performed with the fender communication unit 12 is inputted. By pushing the "Fender com." button 101a with use of a touch panel, clicking the "Fender com." button 101a with use of a mouse, or pushing the "Fender com." button 101a by keyboard operation (hereinafter, all those operations are generally referred to as "push"), a Fender Communication screen 111 illustrated in FIG. 4 is displayed by the computer 11. On the Fender Communication screen 111, a COM port number for use in the communication with the fender communication unit 12 is inputted and a transmission rate of data, a bit number of a data bit, a type of a parity, and a bit number of a stop bit are displayed.

Figure 5:
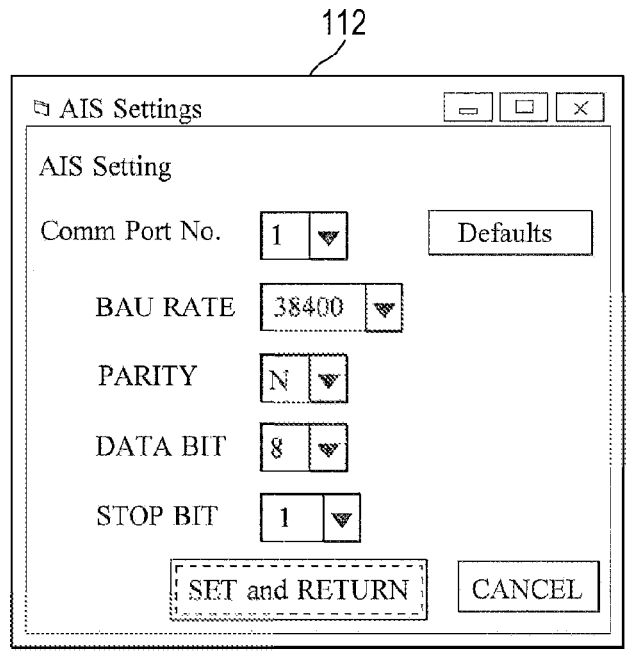
FIG. 5 illustrates an AIS Settings screen in one embodiment of the present invention.

The "AIS com." button 101b is operated when a setting regarding communication performed with the AIS communication unit 13 is inputted. By pushing the "AIS com." button 101b, an AIS Settings screen 112 illustrated in FIG. 5 is displayed by the computer 11. On the AIS Settings screen 112, a COM port number, a baud rate, presence or absence of a parity and a type of the parity, a bit number of a data bit, and a bit number of a stop bit, which are used for the communication with the AIS communication unit 13, are set.

Figure 6:
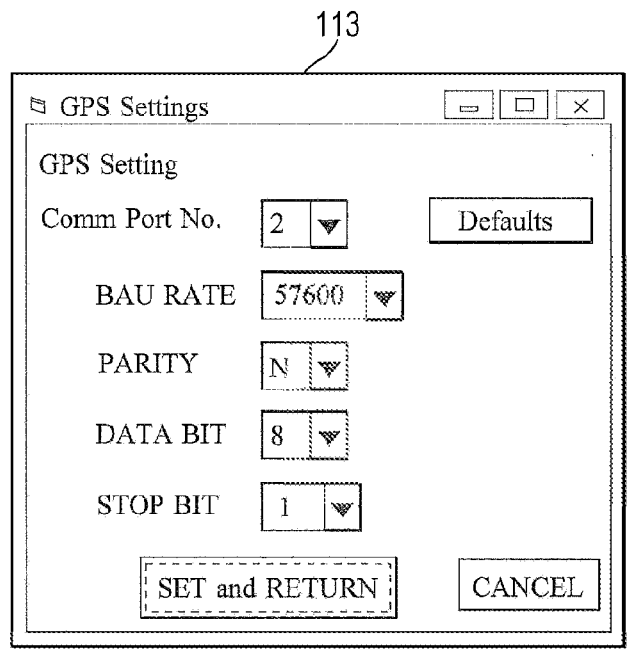
FIG. 6 illustrates a GPS Settings screen in one embodiment of the present invention.

The "GNSS com." button 101c is operated when a setting regarding communication performed with the GNSS communication unit 14 is inputted. By pushing the "GNSS com." button 101c, a GPS Settings screen 113 illustrated in FIG. 6 is displayed by the computer 11. On the GPS Settings screen 113, a COM port number, a baud rate, presence or absence of a parity and a type of the parity, a bit number of a data bit, and a bit number of a stop bit, which are used for the communication with the GNSS communication unit 14, are set.

Figure 7:
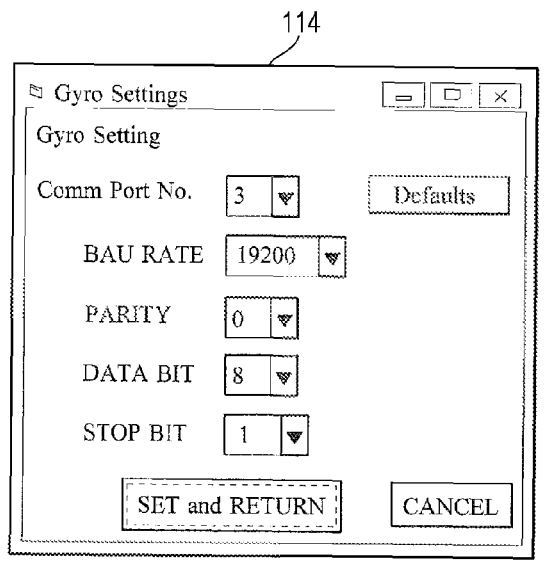
FIG. 7 illustrates a Gyro Settings screen in one embodiment of the present invention.

The "Gyro com." button 101d is operated, when a setting regarding communication performed with the gyro communication unit 15 is inputted. By pushing the "Gyro com." button 101d, a Gyro Settings screen 114 illustrated in FIG. 7 is displayed by the computer 11. On the Gyro Settings screen 114, a COM port number, a baud rate, presence or absence of a parity and a type of the parity, a bit number of a data bit, and a bit number of a stop bit, which are used for the communication with the gyro communication unit 15, are set.

Figure 8:
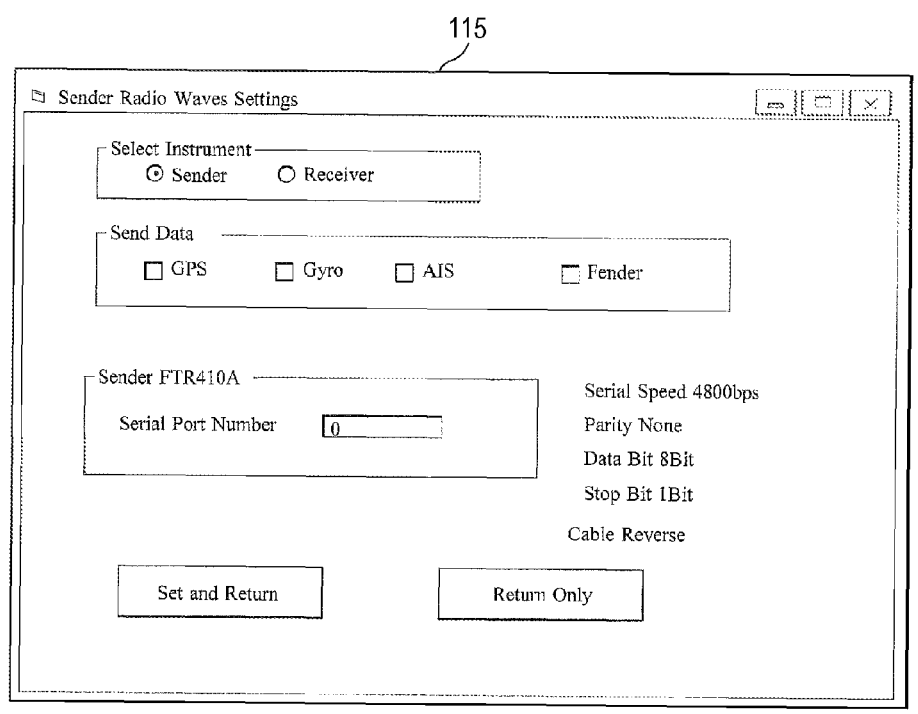
FIG. 8 illustrates a Sender Radio Waves Settings screen in one embodiment of the present invention.

The "Sender Waves com." button 101e is operated when a setting regarding information transmitted via the radio communication unit 16 is inputted. By pushing the "Sender Waves com." button 101e, a Sender Radio Waves Settings screen 115 illustrated in FIG. 8 is displayed by the computer 11. On the Sender Radio Waves Settings screen 115, which data among GPS data, Gyro data, AIS data, and Fender data is selected is inputted as data to be transmitted. A serial port number for use in such transmission is inputted on the screen 115. Further, on the Sender Radio Waves Settings screen 115, a serial communication speed, presence or absence of a parity and a type of the parity, a bit number of a data bit, a bit number of a stop bit, and a type of a communication cable (straight cable or crossover (reverse) cable) are displayed.

Figure 9:
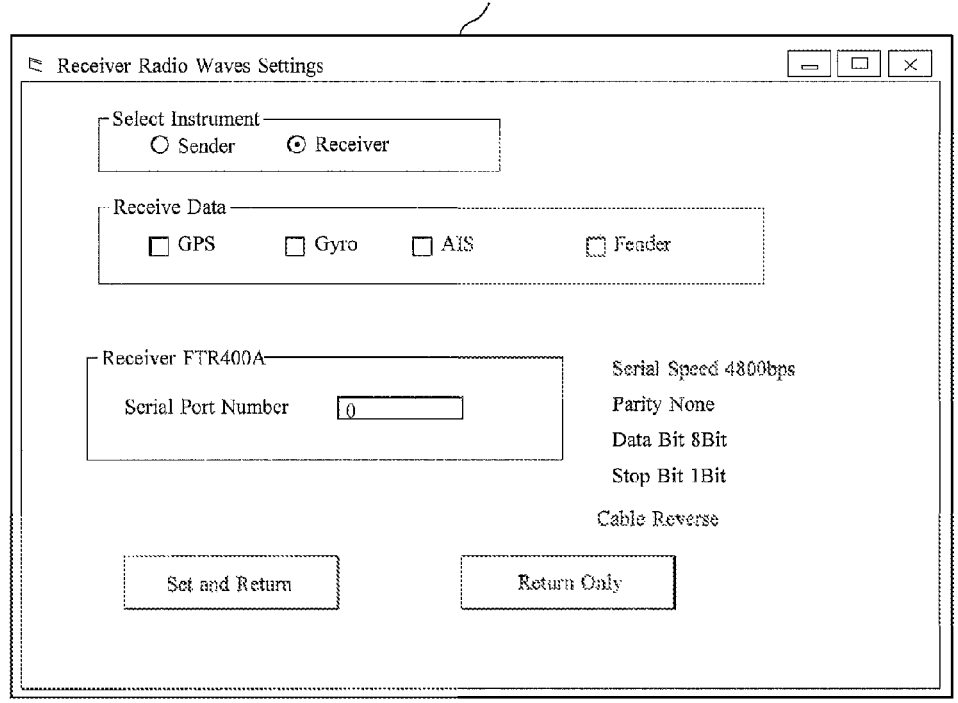
FIG. 9 illustrates a Receiver Radio Waves Settings screen in one embodiment of the present invention.

The "Receiver Waves com." button 101f is operated when a setting regarding information received via the radio communication unit 16 is inputted. By pushing the "Receiver Waves com." button 101f, a Receiver Radio Waves Settings screen 116 illustrated in FIG. 9 is displayed by the computer 11. On the Receiver Radio Waves Settings screen 116, which data among GPS data, Gyro data, AIS data, and Fender data is selected is inputted as data to be received. A serial port number for use in such reception is inputted on the screen 115. Further, on the Receiver Radio Waves Settings screen 116, a serial communication speed, presence or absence of a parity and a type of the parity, a bit number of a data bit, a bit number of a stop bit, and a type of a communication cable (straight cable or crossover (reverse) cable) are displayed.

In the initial setting region 102, a "Fender Information" button 102a, a "Fender Selection" button 102b, a "Fender Initial Pressure" button 102c, a "Ship Selection" button 102d, and a "Ship Information" button 102e are displayed.

Figure 10:
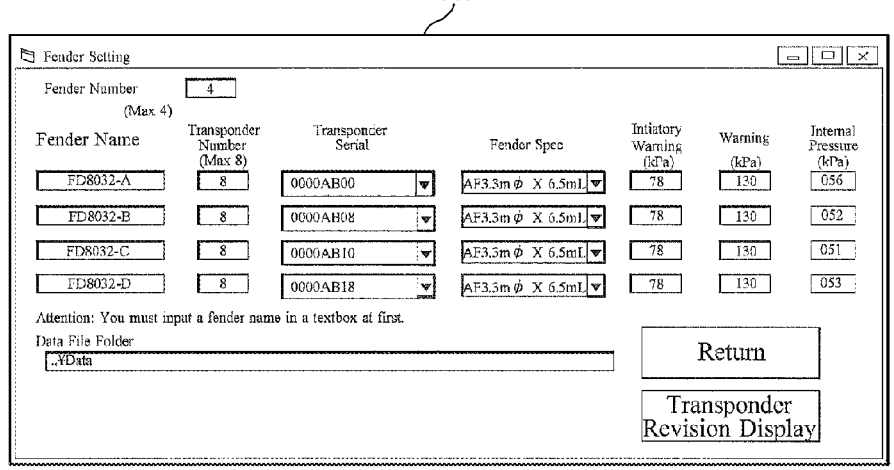
FIG. 10 illustrates a Fender Setting screen in one embodiment of the present invention.

The "Fender Information" button 102a is operated when information on fenders to be monitored in terms of air pressure is set. By pushing the "Fender Information" button 102a, a Fender Setting screen 117 illustrated in FIG. 10 is displayed by the computer 11. On the Fender Setting screen 117, the number offenders to be monitored (Fender Number), names of the fenders (Fender Name), the number of sensors used in each fender (Transponder Number), serial numbers of the sensors (Transponder Serial), a shape such as a diameter and a length of the each fender (Fender Spec.), an initial warning pressure (Initiatory Warning), a warning pressure (Warning), an initial pressure (Internal Pressure), and data folder (Data File Folder) for storing such data are set. Note that information, such as names of fenders provided, at a quay serving as the target object alongside and serial numbers of sensors, is obtained in advance by inquiring of an administrative bureau of a port, and the obtained information is set on the Fender Setting screen 117. Note that the information on the fenders to be monitored in terms of air pressure can be inputted and edited as a setting file prepared in a text format. The information can be also set with use of inputting and editing software in a form of a text file.

Figure 11:
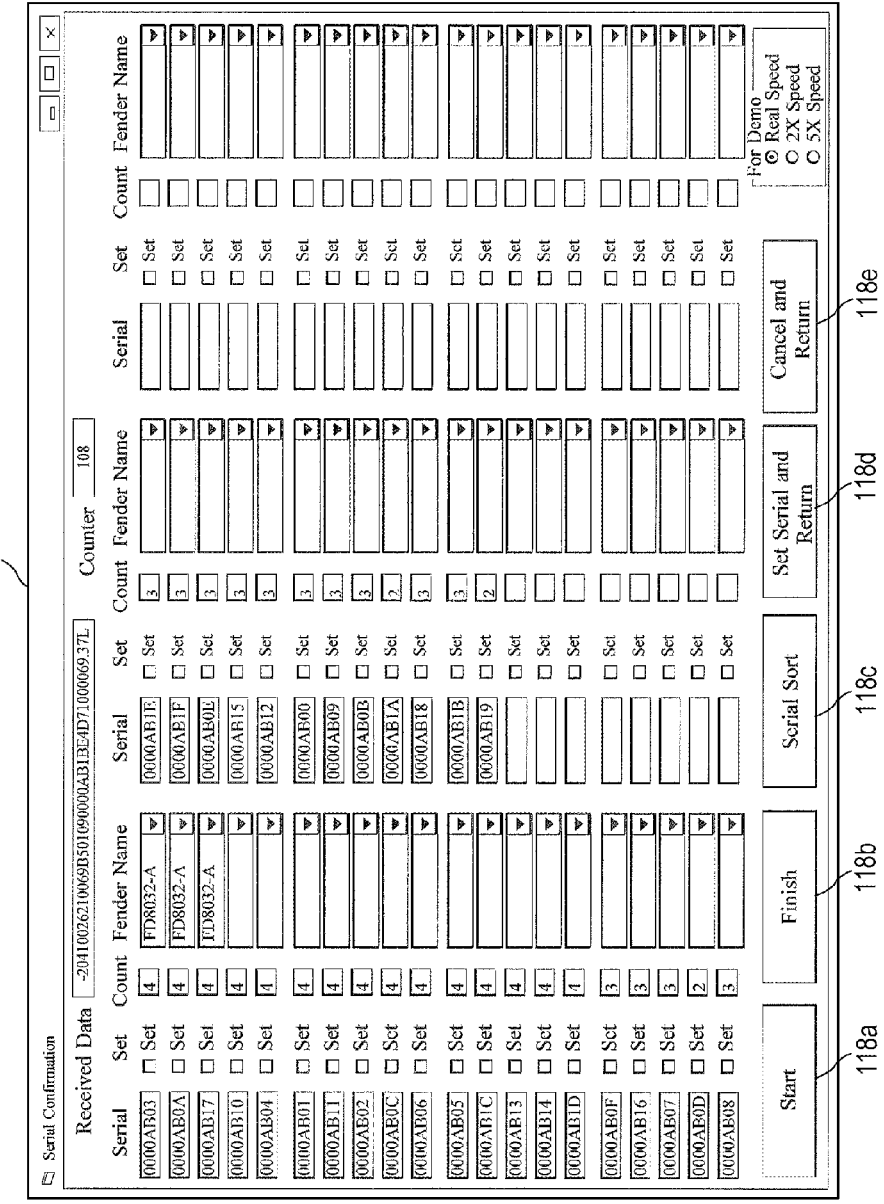
FIG. 11 illustrates a Serial Confirmation screen in one embodiment of the present invention.

The "Fender Selection" button 102b is operated when fenders to be monitored in terms of air pressure are selected. By pushing the "Fender Selection" button 102b, a Serial Confirmation screen 118 illustrated in FIG. 11 is displayed by the computer 11. On the Serial Confirmation screen 118, serial numbers of sensors (Serial), checkboxes regarding whether the sensors are selected or not (Set), the number of times of communication (Count), and names of fenders (Fender Name) are displayed. In a lower part of the screen, a "Start" button 118a, a "Finish" button 118b, a "Serial Sort" button 118c, a "Set Serial and Return" button 118d, and a "Cancel and Return" button 118e are displayed. By pushing the "Start" button 118a, the serial numbers of the sensors transmitted from transponders of the respective fenders are automatically obtained. The obtained serial numbers of the sensors are displayed on the screen. By pushing the "Finish" button 118b, a process of obtaining the serial numbers of the sensors is stopped. By pushing the "Serial Sort" button 118c, the serial numbers displayed by the computer 11 are changed to be arranged in ascending order or descending order. Further, in a case where, after the names of the fenders are set to the sensors to be monitored, checkboxes corresponding to the sensors are checked by clicking and the "Set Serial and Return" 118d button is pushed, checked sensors and fenders are selected as objects to be monitored by the computer 11. Then, the process of selecting the fenders is ended and the main screen 100 is displayed. Therefore, the names of the selected fenders and the serial numbers of the selected sensors are automatically displayed on the Serial Confirmation screen 118 illustrated in FIG. 11. By pushing the "Cancel and Return" button 118e, the process of selecting the fenders is canceled by the computer 11 and the main screen 100 is displayed.

Note that the information, such as the names of the fenders provided at the quay serving as the target object alongside and the serial numbers of the sensors, is obtained in advance by inquiring of an administrative bureau of a port. Based on the obtained information, fenders to be displayed are selected.

Figure 12:
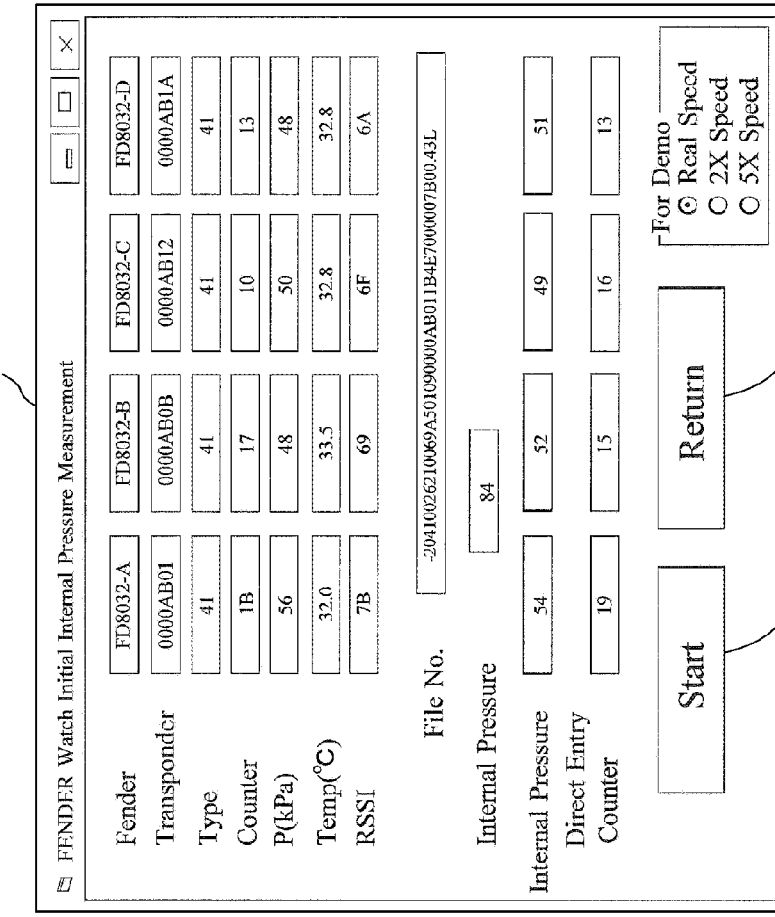
FIG. 12 illustrates a Fender Watch Initial Internal Pressure Measurement screen in one embodiment of the present invention.

The "Fender Initial Pressure" button 102c is operated when information on fenders to be monitored is displayed. By pushing the "Fender Initial Pressure" button 102e, a Fender Watch Initial Internal Pressure Measurement screen 119 illustrated in FIG. 12 is displayed by the computer 11. On the Fender Watch Initial Internal Pressure Measurement screen 119, the names of the four fenders (Fender) that have been set on the Fender Setting screen 117 illustrated in FIG. 10, the serial numbers of the sensors (Transponder), a type of the fenders (Type), the number of times of obtaining data via communication (Counter), measured internal air pressures of the fenders (P (kPa)), measured internal air temperatures of the fenders (Temp (° C.)), a received signal strength indicator of a radio wave (RSSI), an average internal air pressure of the fenders (Internal Pressure), and a direct input unit of internal air pressure values of the fenders (Direct Entry Counter) are displayed. In a lower part of the Fender Watch Initial Internal Pressure Measurement screen 119, the "Start" button 119a and the "Return" button 119b are displayed. By pushing the "Start" button 119a, information (pressure and temperature measured by each sensor) at a time of pushing the button, is obtained and displayed. Therefore, a pressure (initial pressure) of each fender can be measured as necessary. By pushing the "Return" button 119b, the main screen 100 is displayed.

The "Ship Selection" button 101d is operated when the own ship and the another ship or quay serving as the target object alongside are selected. By pushing the "Ship Selection" button 102d, an AIS Communication screen 120 illustrated in FIG. 13 or FIG. 14 is displayed by the computer 11.

Figure 13:
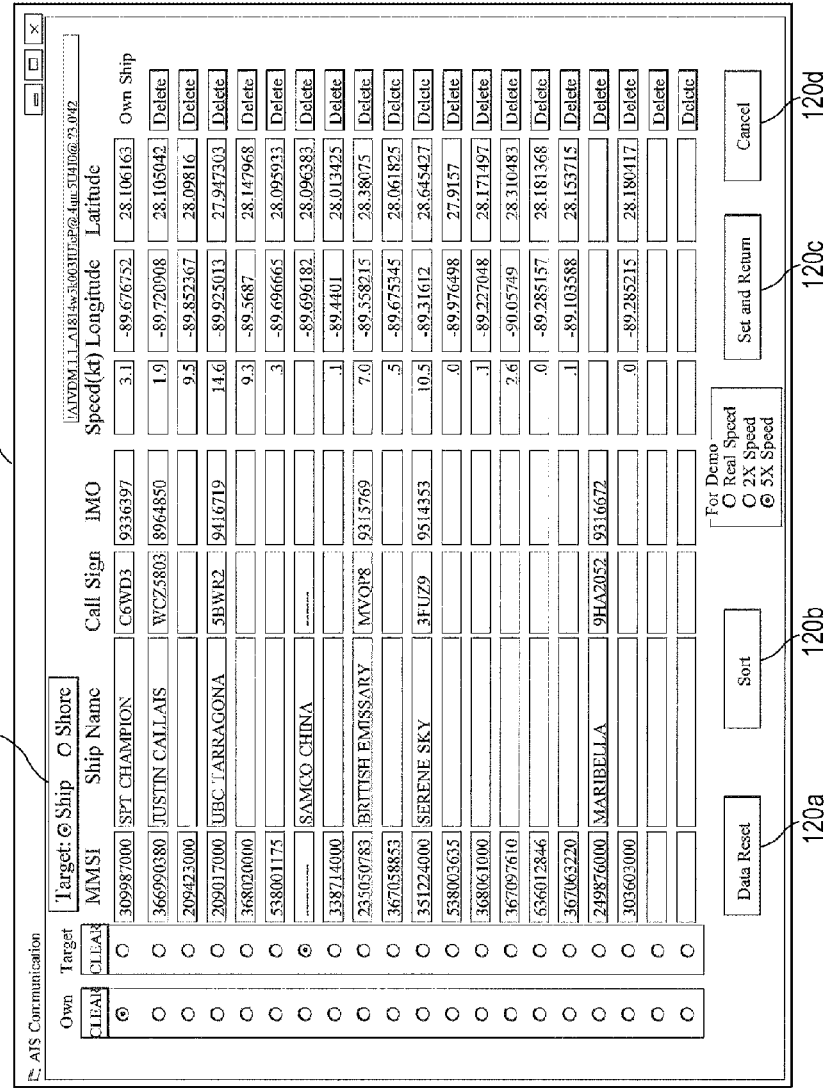
FIG. 13 illustrates an AIS Communication screen in one embodiment of the present invention.

FIG. 13 illustrates a case where the target object alongside is a ship. The screen is displayed when a check button 120e is set to "Ship". FIG. 14 illustrates a case where the target object alongside is a quay. The screen is displayed when the check button 120e is set to "Shore". On the AIS Communication screen 120 of FIG. 13, a region for selecting the own ship (Own), a region for selecting another ship serving as the target object alongside (Target), maritime mobile service identities of other ships around the own ship (MMSI), names of the ships (Ship Name), call signs (Call Sign), international maritime organization ship identification numbers (IMO), a sailing speed of each ship (Speed), longitude where each ship is positioned (Longitude), latitude where each ship is positioned (Latitude), and "Delete" buttons for the respective ships are displayed. On the AIS Communication screen 120 of FIG. 14, the region for selecting the own ship (Own), the maritime mobile service identities of other ships around the own ship (MMSI), the names of the ships (Ship Name), the call signs (Call Sign), the international maritime organization ship identification numbers (IMO), the sailing speed of each ship (Speed), the longitude where each ship is positioned (Longitude), the latitude where each ship is positioned (Latitude), and the "Delete" buttons for the respective ships are displayed. Note that information on the own ship is displayed at the top. Note that, by pushing the "Delete" button, display of information on another ship in a unit corresponding to the "Delete" button can be hidden.

In a lower part of the AIS Communication screen 120 of FIG. 13 and FIG. 14, a "Data Reset" button 120a, a "Sort" button 120b, a "Set and Return" button 120c, and a "Cancel" button 120d are displayed. By pushing the "Data Reset" button 120a, the Information on the own ship and information on all the other ships obtained by the AIS communication unit 13 are initialized. Further, obtaining data is started again and the obtained data is displayed. By pushing the "Sort" button 120b, distances between the own ship and the other ships are calculated based on information on the longitude and the latitude of the own ship and information on the longitude and the latitude of the other ships, and display order of the other ships is changed so that the distances are arranged in ascending order or descending order. Every time when the "Sort" button 120b is pushed, such display is alternately changed so that the distances are arranged in ascending order or descending order. In FIG. 13 in which the target object alongside is a ship, by pushing the "Set and Return" button 120c after the own ship and another ship are selected, the own ship and the another ship are set by the computer 11. Then, the main screen 100 is displayed. In FIG. 14 in which the target object alongside is a quay, by pushing the "Set and Return" button 120c after the own ship (ship to be monitored) is selected, the ship to be monitored is set by the computer 11. Then, the main screen 100 is displayed. Note that an operator can add or change displayed information by manually inputting information. In a case where the own ship comes alongside a quay, as illustrated in FIG. 14, information on all the other ships are not displayed. By pushing the "Cancel" button 120d, the process is stopped by the computer 11. Then, the main screen 100 is displayed.

Figure 15:
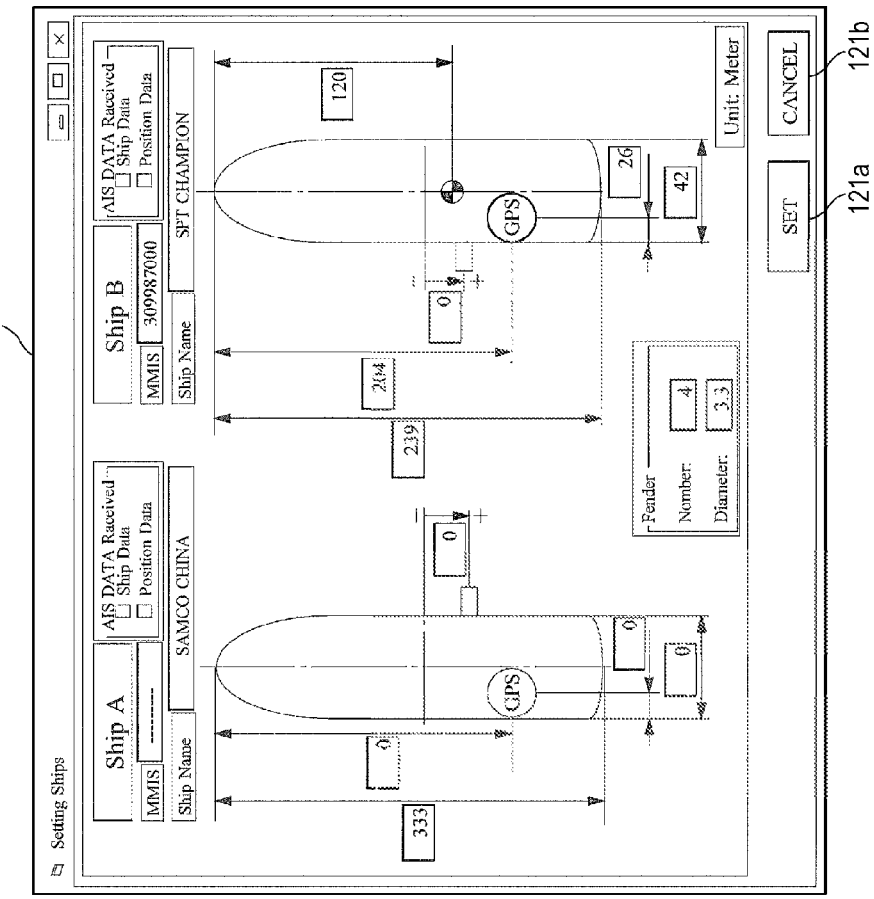
FIG. 15 illustrates a Setting Ships screen in one embodiment of the present invention.
Figure 16:
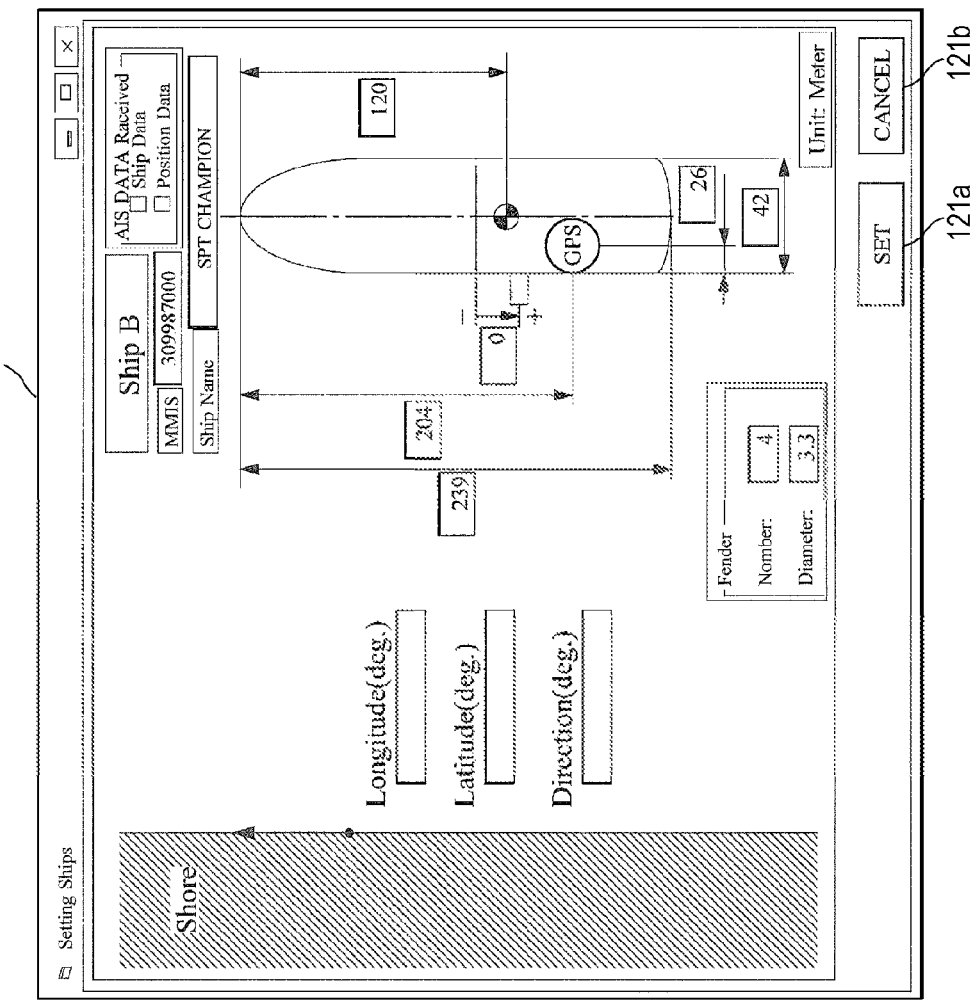
FIG. 16 illustrates a Setting Ships screen in one embodiment of the present invention.

The "Ship Information" button 102e is operated when the information on the own ship and the another ship or the quay serving as the target object alongside is displayed and when the information is set. By pushing the "Ship Information" button 102e, a Setting Ships screen 121 illustrated in FIG. 15 is displayed by the computer 11 in a case where the target object alongside is a ship and a Setting Ships screen 121 illustrated in FIG. 16 is displayed by the computer 11 in a case where the target object alongside is a quay. In FIG. 15 in a case where the target object alongside is a ship, the ship serving as the target object alongside is displayed as "Ship A" and the own ship is displayed as "Ship B" on the Setting Ships screen 121. As the information on the "Ship A", a maritime mobile service identity (MMSI), name of the ship (Ship Name), a length of the ship, a width of the ship, a distance between a tip of the ship and a GPS device, a distance between a left wall of the ship and the GPS device, and a position of a manifold are displayed. As the information on the "Ship B", a maritime mobile service identity (MMSI), name of the ship (Ship Name), a length of the ship, a width of the ship, a distance between a tip of the ship and a GPS device, a distance between a left wall of the ship and the GPS device, a distance between the tip of the ship and a center of a gravity of the ship, and a position of a manifold are displayed. In addition, as information on fenders (Fender), the number of the fenders (Number) and a diameter of the fenders (Diameter) are displayed. In a case where there is information that is not set among the above information, a corresponding display unit is blank. Note that an operator can add and change information corresponding to a blank unit and displayed information, by manually inputting information. In FIG. 16 in a case where the own ship comes alongside a quay, input units of latitude and longitude of a position where the own ship comes alongside the quay and a direction of the quay are displayed as information on the quay. Thus, the information is set.

In a lower part of the Setting Ships screen 121, a "SET" button 121a and a "CANCEL" button 121b are displayed. By pushing the "SET" button 121a, displayed information is set by the computer 11 as the information on the own ship and the information on the another ship or quay serving as the target object alongside. Then, the main screen 100 is displayed. By pushing the "CANCEL" button 121b, the process is stopped by the computer 11. Then the main screen 100 is displayed.

In the used device selection region 104, a checkbox of an "AIS UNIT" corresponding to the AIS communication unit 13, a checkbox of a "GNSS UNIT" corresponding to the GNSS communication unit 14, a checkbox of a "Gyro UNIT" corresponding to the gyro communication unit 15, a checkbox of a "Waves Sender" corresponding to a transmitter of the radio communication unit 16, a checkbox of a "Waves Receiver" corresponding to a receiver of the radio communication unit 16, and a checkbox of a "Fender Unit" corresponding to the fender communication unit 12 are displayed. A checkbox of a device to be used is checked. Note that, in a case where the target object alongside does not include the ship monitoring device 1 like a quay, the "Waves Sender" corresponding to the transmitter of the radio communication unit 16 of the used device selection region 104 and the "Waves Receiver" corresponding to the receiver of the radio communication unit 16 are unchecked.

In the monitoring mode selection region 103, a "Fender Monitoring" button 103a and a "Ship and Fender Monitoring" button 103b are displayed.

Figure 17:
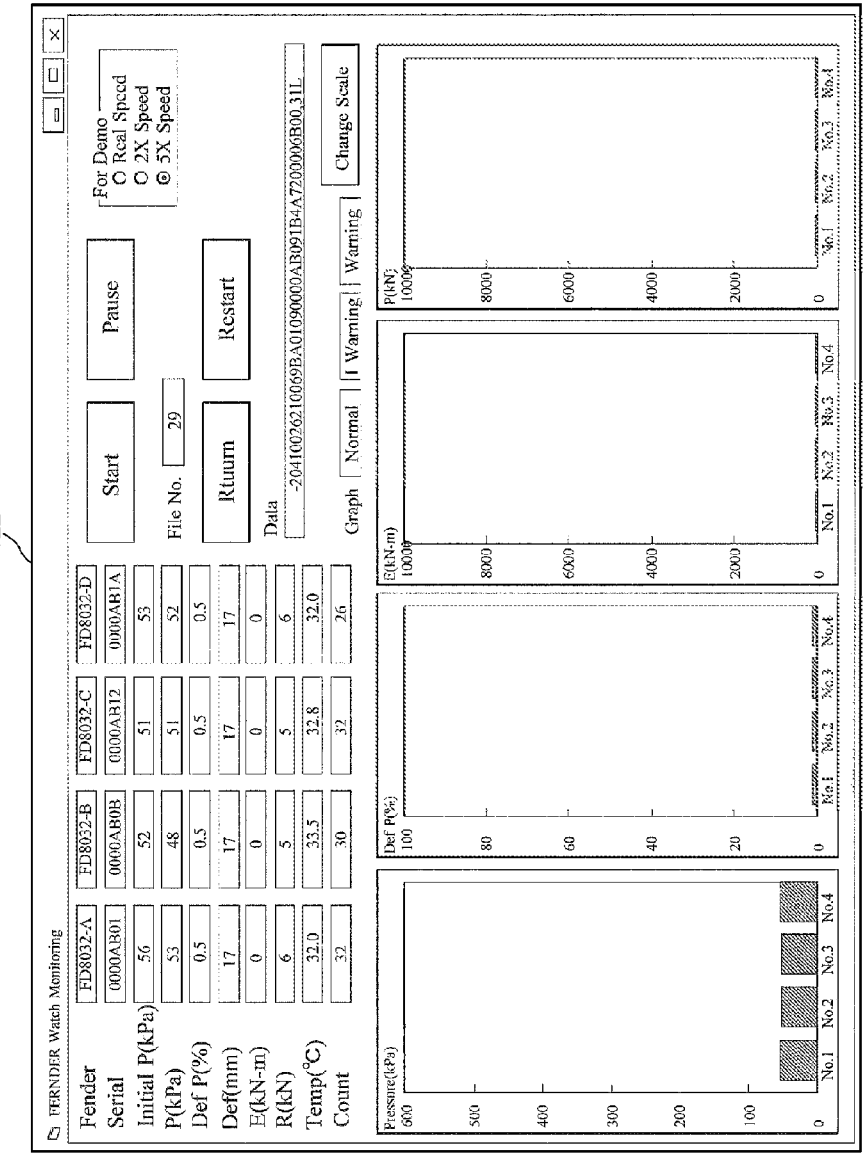
FIG. 17 illustrates a FENDER Watch Monitoring screen in one embodiment of the present invention.

The "Fender Monitoring" button 103a is operated when detailed information on the fenders is displayed and a state of the fenders is monitored. By pushing the "Fender Monitoring" button 103a, a FENDER Watch Monitoring screen 122 illustrated in FIG. 17 is displayed by the computer 11. On the FENDER Watch Monitoring screen 122, the names of the four fenders that have been set on the Setting screen 117 (Fender), the serial numbers of the sensors (Transponder), the initial internal air pressures of the fenders (Initial P (kPa)), measured internal air pressures of the fenders (P (kPa)), the degree of deformation of the fenders (%) (DefP (%)), the degree of deformation of the fenders (mm) (Def (mm)), energy of the fenders (E (kN-m)), reaction force of the fenders (R (kN)), measured internal air temperatures of the fenders (Temp (° C.)), and the number of times of obtaining data via communication (Counter) are displayed.

In a lower part of the FENDER Watch Monitoring screen 122, the measured internal air pressures of the respective fenders (Pressure (kPa)), the degrees of deformation of the respective fenders (DefP (%)), the energy of the respective fenders (E (kN-m)), and the reaction force of the respective fenders (R (kN)) are individually displayed by bar graphs in real time. Note that the bar graph of the internal air pressure is usually displayed in yellow. However, in a case where the internal air pressure of any of the fenders becomes the initial warning pressure that has been set on the Fender Setting screen 117 illustrated in FIG. 10, the bar graph of the internal air pressure is displayed in red. Further, in a case where the internal air pressure of any of the fenders becomes a warning pressure, a warning sound is emitted.

In an upper right part of the FENDER Watch Monitoring screen 122, a "Start" button, a "Pause" button, a "Return" button, and a "Restart" button are displayed. By pushing the "Start" button, a display process is started by the computer 11. By pushing the "Pause" button, the display process is stopped. In a case where the "Pause" button is pushed and the display process is stopped, the display process is started again by pushing the "Restart" button by the computer 11. By pushing the "Return" button, the display process by the computer 11 is terminated. Then, the main screen 100 is displayed.

Figure 18:
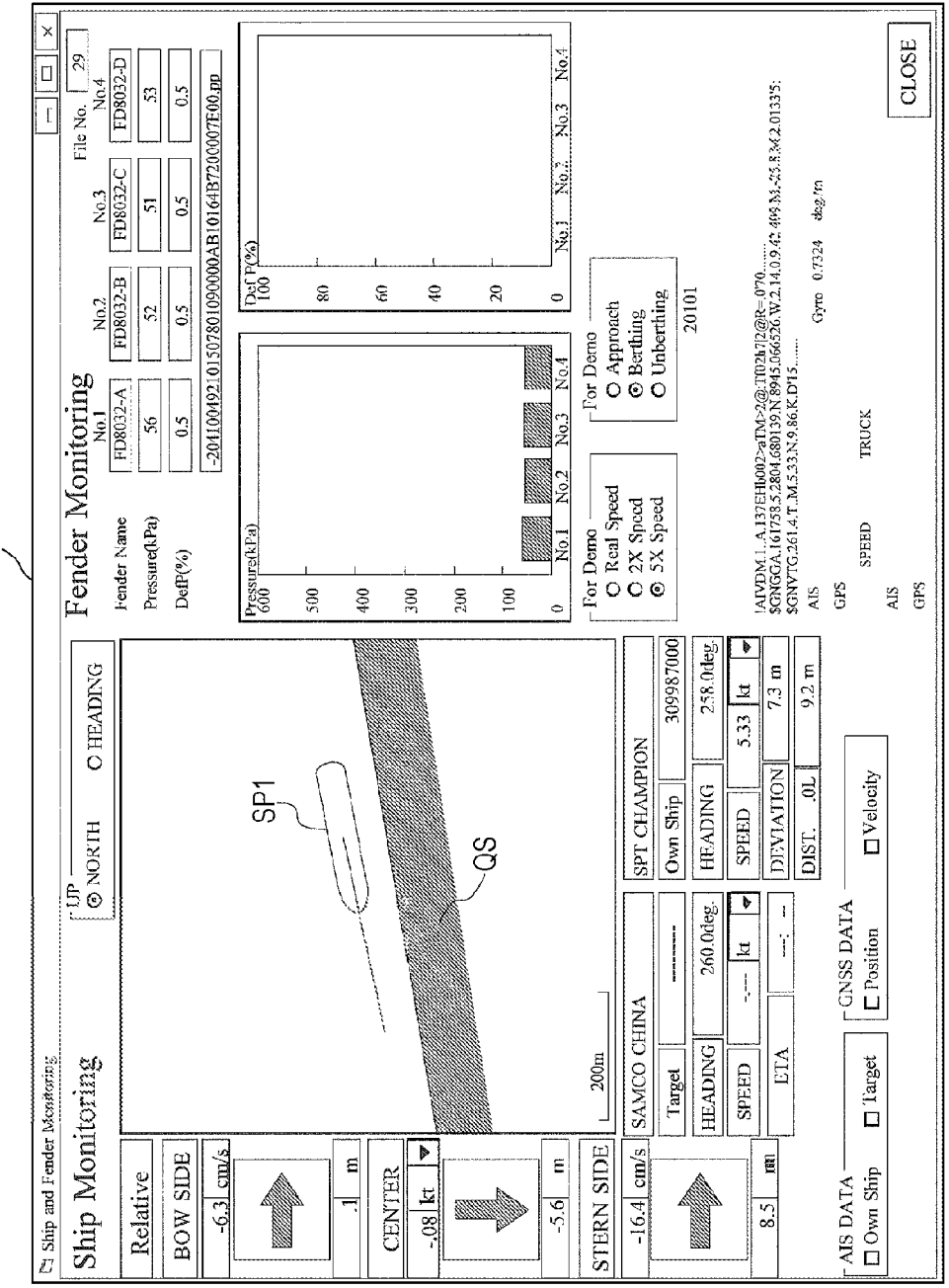
FIG. 18 illustrates a Ship and Fender Monitoring screen in one embodiment of the present invention.

The "Ship and Fender Monitoring" button 103b is operated when a positional relationship between the own ship and the another ship or quay, which serves as the target object alongside, is displayed in animation in real time and when the state of the fenders is monitored in real time. By pushing the "Ship and Fender Monitoring" button 103b, a Ship and Fender Monitoring screen 123 illustrated. In FIG. 18 is displayed by the computer 11. That is, by displaying the Ship and Fender Monitoring screen 123 in a case where the own ship comes alongside the another ship, the ship can be easily steered when the ship comes alongside the another ship.

In a left half of the Ship and Fender Monitoring screen 123, the own ship SP1 and the another ship or quay QS serving as the target object alongside are displayed in animation. In an upper part thereof, a region (UP) for selecting whether an upper direction of animation display indicates north (NORTH) or a bow (HEADING) is displayed.

In a left side of such animation display region, a relative value display region (Relative) is displayed. In the relative value display region (Relative), a relative speed, a relative direction, and a relative distance in a bow part (BOW SIDE) of the own ship SP1 with respect to the another ship or quay, those in a center part (CENTER) thereof with respect to the another ship or quay, and those in a stern part (STERN SIDE) thereof with respect to the another ship or quay are displayed. As a unit of the displayed relative speed, knot (kt) or meter per second (m/s) can be selected. The relative direction is displayed as an arrow. The relative distance is displayed by meter.

In a lower side of the animation display region, the information on the own ship and the another ship or quay and an estimated time of arrival (ETA) are displayed. As the information on the another ship serving as the target object alongside, the name of the another ship, the maritime mobile service identity of the another ship (Target), the bow direction (HEADING), and the speed (SPEED) are displayed. Note that, as a display unit of the speed of the another ship (SPEED), knot (kt) or meter by second (m/s) can be selected. As the information on the quay serving as the target object alongside, name of the quay and a direction (HEADING) in which the quay is extended are displayed. As the information on the own ship, the name of the own ship, the maritime mobile service identity of the own ship (Own Ship), the bow direction (HEADING), the speed (SPEED), a lateral direction distance (DEVIATION) between the own ship and the another ship, and an inter-ship distance (DIST) between the own ship and the another ship are displayed. Note that, as a display unit of the speed (SPEED) of the own ship, knot (kt) or meter by second (m/s) can be selected. The bow direction (HEADING) and the speed (SPEED) of the own ship and those of the another ship, the lateral direction (DEVIATION) between the own ship and the another ship or quay, the inter-ship distance (DIST) between the own ship and the another ship or quay, and the estimated time of arrival (ETA) are displayed in real time.

In a right half of the Ship and Fender Monitoring screen 123, the information on the fenders are displayed. As the information on the fenders, the names of the four fenders that have been set on the Setting screen 117 (Fender), the measured internal air pressures of the fenders (Pressure (kPa)), and the degrees of deformation, of the fenders (DefP (%)) are displayed. In a lower part thereof, the measured, internal air pressures of the respective fenders (Pressure (kPa)) and the degrees of deformation of the respective fenders (DefP (%)) are individually displayed by bar graphs in real time.

Figure 19:
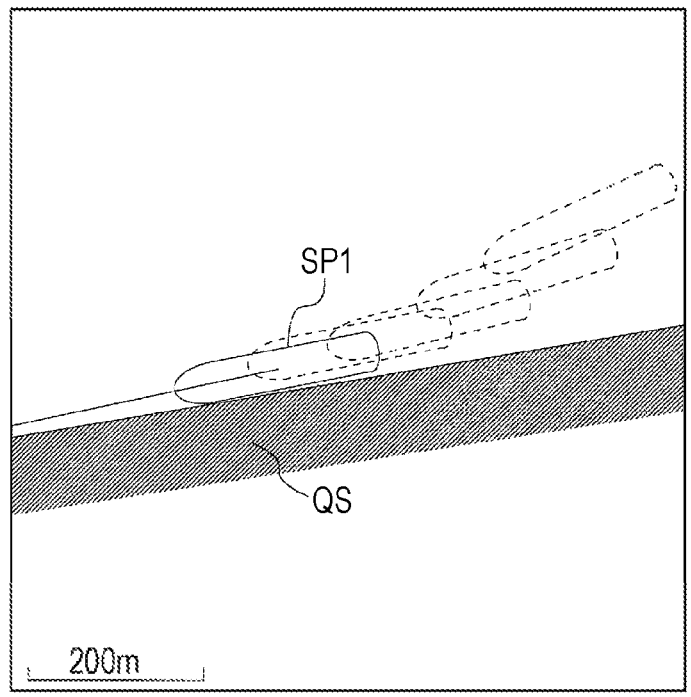
FIG. 19 is an explanatory view of redisplay of positional information ors own ship and a target object alongside in one embodiment of the present invention.

The computer 11 chronologically stores, in the storage device included in computer 11, the positional information on the own ship, the positional information, on the target ship alongside or the target quay alongside, and the fender information that have been obtained since the computer 11 had been started. Based on the positional information on the own ship, the positional information on the target ship alongside or the target quay alongside, and the fender information that has been chronologically stored, as illustrated in FIG. 19, the position of the own ship, the position of the target ship alongside or the target quay alongside, and the fender information can be displayed again with the lapse of time. Note that not only the positional information on the ships but also time information are stored. Therefore, by designating what time to what time, the corresponding information can be displayed again.

An information transmission interval of the AIS information is usually different depending on a moving speed of a ship. For example, information on a moored ship is transmitted every 3 minutes, in a case of a moving ship, ship information on the ship is transmitted every 2 seconds in a case where a speed of the ship is fast and is transmitted every 12 seconds in a case where the speed of the ship is slow. Thus, in a case where only the AIS information is used, accurate ship information cannot be obtained in real time. In the ship monitoring device 1 of this embodiment, not only the AIS communication unit 13 but also the GNSS communication unit 14, the gyro communication unit 15, and the radio communication unit 16 are provided. In the GNSS communication unit 14, data can be obtained at a high frequency having 2 or more Hz. Also in the gyro communication unit 15, data can be obtained at a high frequency having 2 or more Hz. The ship monitoring device 1 of this embodiment further includes the radio communication unit 16. Therefore, information that the AIS information does not have can be supplied to the target ship alongside from the own ship. Further, information on the target ship alongside that the AIS information does not have can be obtained from the target ship alongside. Therefore, the ship monitoring device 1 of this embodiment displays, based on all the obtained information, the positional information on the own ship, the positional information on the target object alongside such as another ship and a quay, and the fender information. Thus, accurate information can be displayed in real time. More pieces of information can be therefore displayed on the state of the fenders. In addition, by using the ship monitoring device 1 of this embodiment, in a case where the own ship comes alongside the target object alongside, a ship can be more easily steered, as compared with conventional ship monitoring devices. Further, by using the ship monitoring device 1 of this embodiment, in a case where the own ship comes alongside the target ship alongside, a ship can be more easily steered, as compared with conventional ship monitoring devices.

The present application is based on Japanese Patent Applications No. 2012-162479 and No. 2012-162486 filed by the present applicant in Japan on Jul. 23, 2012, the entire contents of which are incorporated herein by reference.

INDUSTRIAL APPLICABILITY

More pieces of information can be displayed on a state of fenders and always display positions of own ship and a target object alongside in animation based on the latest positional information on the target object alongside. Therefore, accurate information can be accurately displayed in real time. By using a ship monitoring device of the present invention, in a case where the own ship comes alongside the target object alongside, a ship can be more easily steered, as compared with the conventional ship monitoring devices.

DESCRIPTION OF REFERENCE SIGNS

1 Ship-monitoring device
11 Computer
12 Fender communication unit
13 AIS communication unit
14 GNSS communication unit
15 Gyro communication unit
16 Radio communication unit
17 Display unit
18 Operation unit
2A to 2D Fender
3A to 3D Transponder
SP1 Own ship
SP2 Target ship alongside
QS Quay
100 Main screen
101 Used device communication-related setting region
101*a* "Fender com." button
101*b* "AIS com." button.
101*c* "GNSS com." button.
101*d* "Gyro com." button
101*e* "Sender Waves com." button
101*f* "Receiver Waves com." button
102 Initial setting region
103 Monitoring mode selection region
104 Used device selection region
105 Termination button
111 Fender Communication screen
112 AIS Settings screen
113 GPS Settings screen
114 Gyro Settings screen
115 Sender Radio Waves Settings screen
116 Receiver Radio Waves Settings screen
117 Fender Setting screen
118 Serial Confirmation screen
119 Fender Watch Initial Internal Pressure Measurement screen
119*a* "Start" button
119*b* "Return" button
120 AIS Communication screen
120*a* "Data Reset" button
120*b* "Sort" button
120*c* "Set and Return" button
120*d* "Cancel" button
121 Setting Ships screen
121*a* "SET" button
121*b* "CANCEL" button
122 FENDER Watch Monitoring screen
123 Ship and Fender Monitoring screen

The invention claimed is:

1. A ship monitoring device, comprising:
a display unit configured to display in animation a position of own ship and a position of a target ship alongside to display a state in which the own ship comes alongside the target ship alongside, based on information on the own ship navigating on the sea and information on the target ship alongside;
an air pressure obtaining unit configured to obtain internal air pressure information on a plurality of fenders serving as a cushioning material that is positioned between the own ship and the target ship alongside in a case where the own ship comes alongside the target ship alongside;
means for receiving AIS information transmitted from an automatic identification system (AIS) of the target ship alongside, the AIS information including positional information on the target ship alongside;
storage means for storing the received AIS information;
communication means for obtaining, from the target ship alongside, positional information obtained from a global navigation satellite system (GNSS);
means for manually inputting positional information on the target ship alongside;
a computer for rewriting the positional information on the target ship alongside included in the AIS information stored in the storage means with use of any one of the positional information obtained from the GNSS by the communication means and the positional information manually inputted; and
means for displaying the position of the target ship alongside based on the rewritten positional information on the target ship alongside stored in the storage means.

2. The ship monitoring device according to claim 1, further comprising:
means for receiving AIS information on ships existing in a region with a predetermined radius having the position of the own ship as a center;
means for displaying, based on the received AIS information, information on the own ship and information on all other ships existing in the region; and
means for selecting any one of displayed ships as the target ship alongside.

3. The ship monitoring device according to claim 2, further comprising:
means for calculating distances between the own ship and the other ships; and
means for changing, based on the calculated distances, order of pieces of the information on the other ships so that the distances are arranged in descending order or ascending order.

4. The ship monitoring device according to claim 2, further comprising
means for hiding display of a predetermined ship among the other ships.

5. The ship monitoring device according to claim 1, further comprising
means for inputting,
as the information on the own ship, one or more of information on a shape of the own ship, information on a manifold position and regarding on which side (right or left) the own ship and the target ship alongside come alongside each other, information on a shape of the fenders, and information on a center of gravity of the own ship, and
as the information on the target ship alongside, one or more of information on a shape of the target ship alongside, information on a manifold position and regarding on which side (right or left) the own ship and the target ship alongside come alongside each other, information on a shape of the fenders, and information on a center of gravity of the target ship alongside.

6. The ship monitoring device according to claim 1, further comprising
means for displaying in animation a positional relationship between the own ship and the target ship alongside in real time and displaying a value of an internal air pressure of each of the fenders by a bar graph in real time.

7. The ship monitoring device according to claim 6, further comprising
means for displaying, in real time, a relative speed of the own ship with respect to the target ship alongside, a relative distance between the own ship and the target ship alongside, and an estimated time of arrival at which the own ship comes alongside the target ship alongside.

8. The ship monitoring device according to claim 1, further comprising:
a gyro sensor configured to obtain information on a ship; and
a receiver configured to receive a radio wave from the global navigation satellite system (GNSS).

9. The ship monitoring device according to claim 7, further comprising
means for selecting any one of knot and meter per second as a unit of the displayed speed.

10. The ship monitoring device according to claim 1, further comprising
means for chronologically storing the obtained positional information on the own ship and the obtained positional information on the target ship alongside.

11. The ship monitoring device according to claim 10, further comprising
means for displaying in animation the positions of the own ship and the target ship alongside in time series based on the positional information on the own ship and the positional information on the target ship alongside that have been chronologically stored.

12. A ship monitoring device, comprising:
a display unit configured to display in animation a position of own ship and a position of a target object alongside to display a state in which the own ship comes alongside the target object alongside, based on information on the own ship navigating on the sea and information on the target object alongside;
a fender information obtaining unit configured to obtain fender information including internal air pressure information and internal temperature information of a plurality of fenders serving as a cushioning material that is positioned between the own ship and the target object alongside in a case where the own ship comes alongside the target object alongside;
a storage unit configured to store predetermined information;
means for obtaining the fender information in a state in which external force is not applied to the fenders and storing, in the storage unit, the obtained fender information as fender initial information;
means for obtaining the fender information in a state in which external force is applied to the fenders and calculating a degree of deformation of the fenders with use of the obtained fender information and the fender initial information;

means for obtaining positional information on the own ship and storing the obtained positional information in the storage unit;

means for manually inputting positional information on the target object alongside;

means for storing, in the storage unit, the manually inputted positional information on the target object alongside; and means for, based on the information stored in the storage means, displaying the position of the target object alongside and the position of the own ship and displaying the fender information and the degree of deformation.

13. The ship monitoring device according to claim 12, further comprising means for displaying in animation a positional relationship between the own ship and the target object alongside in real time and displaying a value of an internal air pressure and a degree of deformation of each of the fenders by a bar graph in real time.

14. The ship monitoring device according to claim 13, further comprising means for displaying, in real time, a relative speed of the own ship with respect to the target object alongside, a relative distance between the own ship and the target object alongside, and an estimated time of arrival at which the own ship comes alongside the target ship alongside.

15. The ship monitoring device according to claim 12, further comprising:

a gyro sensor configured to obtain information on a ship; and a receiver configured to receive a radio wave from the global navigation satellite system (GNSS).

16. The ship monitoring device according to claim 12, further comprising:

means for setting, as a warning air pressure value, a predetermined air pressure value that is not more than a minimum value within an internal air pressure value range in which the fenders may be broken; and means for emitting a warning sound when the internal air pressure value of any of the fenders reaches the warning air pressure value.

17. The ship monitoring device according to claim 12, further comprising means for chronologically storing the obtained positional information on the own ship, the obtained positional information on the target object alongside, the fender information on each of the fenders, and the degree of deformation of each of the fenders.

18. The ship monitoring device according to claim 17, further comprising means for, based on the positional information on the own ship, the positional information on the target object alongside, the fender information on each of the fenders, and the degree of deformation of each of the fenders that have been chronologically stored, displaying in animation the positions of the own ship and the target object alongside in time series and displaying the fender information on each of the fenders and the degree of deformation of each of the fenders in time series.

* * * * *